United States Patent
Kim

(10) Patent No.: US 6,723,022 B2
(45) Date of Patent: Apr. 20, 2004

(54) DEVICE AND METHOD FOR SHIFT CONTROLLING OF AUTOMATIC TRANSMISSION IN VEHICLE

(75) Inventor: Gi-Joon Kim, Kunpo (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/040,731

(22) Filed: Dec. 28, 2001

(65) Prior Publication Data

US 2002/0119863 A1 Aug. 29, 2002

(30) Foreign Application Priority Data

Dec. 28, 2000 (KR) ........................... 2000-84352

(51) Int. Cl.[7] .................. B60K 41/02; B60K 41/24; B60K 41/28; F16H 61/00; G06F 17/00
(52) U.S. Cl. .................. 477/70; 477/117; 477/120; 477/121; 701/60
(58) Field of Search ................. 477/70, 77, 97, 477/117, 120, 121, 124, 127; 701/60, 61; 475/904

(56) References Cited

U.S. PATENT DOCUMENTS

| | | | |
|---|---|---|---|
| 5,029,086 A | * | 7/1991 | Yoshimura ............ 701/60 |
| 5,370,016 A | | 12/1994 | Fujita et al. |
| 5,383,125 A | * | 1/1995 | Hibi ...................... 701/87 |
| 5,435,796 A | | 7/1995 | Fujita et al. |
| 5,443,432 A | | 8/1995 | Fujita et al. |
| 5,445,579 A | | 8/1995 | Fujita et al. |
| 5,505,675 A | * | 4/1996 | Kuriyama et al. ...... 477/156 |
| 5,816,950 A | * | 10/1998 | Kamada et al. ........ 477/148 |

\* cited by examiner

Primary Examiner—Tisha D. Lewis
(74) Attorney, Agent, or Firm—Morgan Lewis & Bockius LLP

(57) ABSTRACT

Device and method for shift control in an automatic transmission of a vehicle wherein the feedback control includes determining relative rate of change in turbine revolution during power-on up-shift, thereby preventing generation of shift impact in the shifting process. The device comprises a vehicle run state detecting unit for detecting a vehicle run state; a shift control unit for performing a power-on up-shift control, including controlling the relative rate of change in turbine revolution; and a driving unit for supplying and stopping supply of oil pressure discharged from an oil pump to perform the shifting in response to shift mode state output synchronization, throttle valve openness, revolution at output shaft, engine revolution, shift lever position and acceleration pedal operation state.

6 Claims, 3 Drawing Sheets

DEVICE AND METHOD FOR SHIFT CONTROLLING OF AUTOMATIC TRANSMISSION IN VEHICLE

BACKGROUND OF THE INVENTION

The present invention relates to device and method for shift control in an automatic transmission, and more particularly to device and method for shift control that is adapted to reduce shift impact.

In general, a vehicle automatic transmission is mounted with a shift control device to automatically adjust the shift ratio in relation to running speed and load of the vehicle. The shift control device controls a plurality of clutches and brakes cooperating with the gear train in actuated or non-actuated states to adjust the revolutions at the output end of the planetary gear device.

FIG. 3 is a graph illustrating changes in turbine revolution during the up-shift control process in the power-on state in a conventional shift control device. In the "power-on" state, the vehicle is running due to the driving force of the engine. When vehicle speed and openness of the throttle valve are changed to meet a shift condition while the vehicle is running, the shift control device detects revolutions at the transmission output shaft before the shift in order to calculate turbine revolution prior to shifting (Nti). The shift control device detects and calculates the turbine revolution in real time even while the shift occurs (Nt). The shift control device also controls a solenoid valve in the hydraulic system of the automatic transmission to allow the turbine revolution (Nt) thus calculated to be changed in the same pattern as shown in FIG. 3. Furthermore, the shift control device controls the solenoid valve to maintain turbine revolutions after shifting (Ntj).

In other words, the shift control device controls the solenoid valve to cause the turbine revolutions (Nt) to be decreased at a higher rate of change during the first step in the shifting process. Thereafter, the shift control device controls the solenoid valve to cause the turbine revolutions (Nt) to be decreased at a lower rate of change by two steps. The rate of change in turbine revolutions is higher at the second step to obtain a swift response upon shifting, and the rate of change in turbine revolutions is lower at the second of the latter two steps to reduce shift impact to the greatest extent possible.

However, one problem in the conventional shift control device thus described occurs when the vehicle wheels slip due to outside influence while shifting is in progress. In this situation, to increase turbine revolutions subsequent to shifting (Ntj), control time (a1), for decreasing the turbine revolution (Nt) to the lower rate of change during the second step, is shortened below a control time (a0) under a normal state, as shown with a solid line in FIG. 4. Thus, when the control time (a1) is decreased, a complete shift control cannot be realized resulting in the generation of shift impact.

SUMMARY OF THE INVENTION

The present invention provides a device and a method for shift control in a vehicle automatic transmission adapted to realize complete control, even when revolutions of the output shaft change due to external influences occurring during the up-shift control process, thereby reducing the shift impact.

In a preferred embodiment of the invention, a shift control device includes vehicle run state detecting means, shift control means and driving means. The vehicle run state detecting means detects a vehicle run state variably output according to a run state of a vehicle. The shift control means performs a power-on up-shift control and controls the turbine revolution relative rate of change after shifting during the control process to effect a power-on up-shift feedback control when a predetermined control signal is output to the vehicle run state detecting means in order to receive back a signal detected by the vehicle run state detecting means. Also, a power-on up-shift signal is input to the shift control means from the vehicle by way of vehicle shift mode state output in synchronization with the control signal, throttle valve openness, revolution of the output shaft, engine revolution, shift lever position and acceleration pedal operation state. The driving means controls the supply of oil pressure discharged from an oil pump to perform the shift in response to a predetermined shift control duty signal output from the shift control means.

In a further aspect of the invention, a method for shift control includes effecting a power-on up-shift control when a power-on up-shift signal is input from the vehicle and controlling the relative rate of change in turbine revolutions after shifting in the shift control process to effect a power on up-shift feedback control.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Now, preferred embodiment of the present invention will be described in detail with reference to the accompanying drawings.

Figure 1:
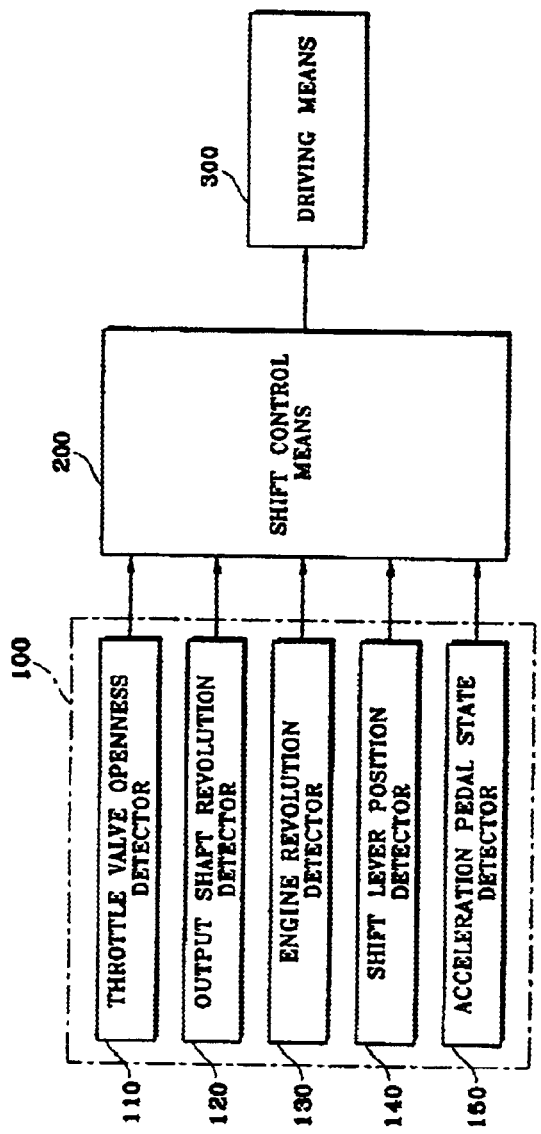
FIG. 1 is a block diagram of a shift control device for an automatic transmission according to the present invention.

As depicted in FIG. 1, a shift control device for an automatic transmission according to the present invention includes a vehicle run state detecting unit 100 for detecting the vehicle run state based on a variety of sensors as described below, a shift control unit 200 that communicates with detecting unit 100 and with a driving unit 300. As will be understood by persons skilled in the art, the transmission includes, other than control unit 200, typical components such as a torque converter with a turbine, hydraulic system and planetary gear train. Control unit 200 outputs a predetermined control signal to detecting unit 100 in order to receive signals detected by detecting unit 100. Based on these inputs, control unit 200 generates the control signal to perform a synchronized power-on up-shift control when the power-on up-shift signal is input from the vehicle. During this process, control unit 200 controls the relative rate of change in turbine revolutions and effects power-on up-shift feedback control as described below. The driving unit 300 is duty-controlled by a predetermined shift control duty signal output from shift control unit 200 in order to control supply of oil pressure discharged from an oil pump to perform the shifting. Control unit 200 may include a processor programmed to execute the feedback control methodology, as explained below.

The vehicle run state detecting unit 100 includes a throttle valve openness detector 110 for detecting openness of the throttle valve, communicating with the acceleration pedal operated by a driver, an output shaft revolution detector 120 for detecting revolution of the transmission output shaft (used to determine shift stage along with the throttle openness and corresponding to vehicle speed), an engine revolution detector 130 for detecting engine revolution varying in accordance with run state of the vehicle for application to determination of shift stage, a shift lever position detector 140 for detecting the position of the shift lever as manipulated by the driver, and an acceleration pedal operation detector 150 for detecting the operative state of the acceleration pedal as manipulated by the driver.

Figure 2:
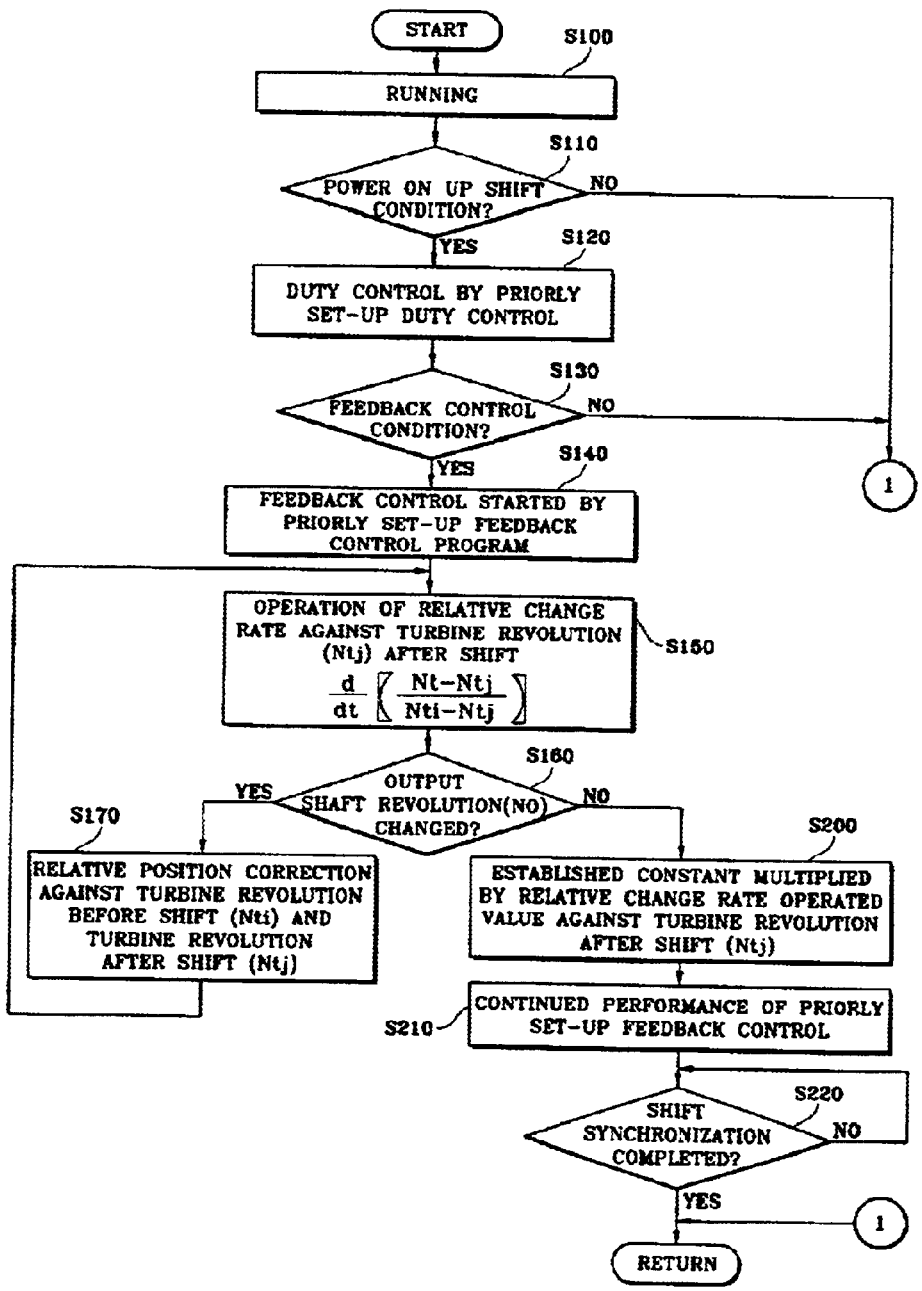
FIG. 2 is a flow chart of a shift control method for an automatic transmission according to the present invention.
Figure 3:
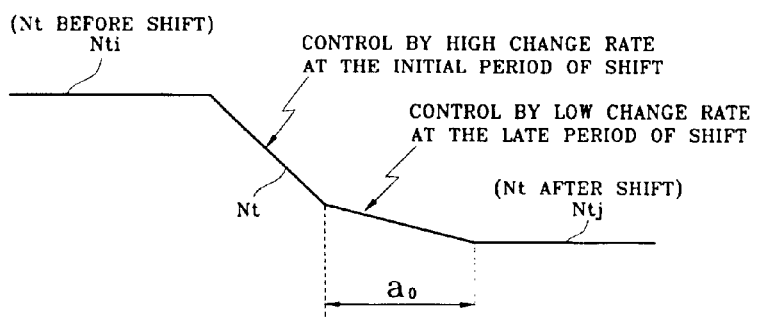
FIG. 3 is a graph illustrating turbine revolution changes according to the prior art.
Figure 4:
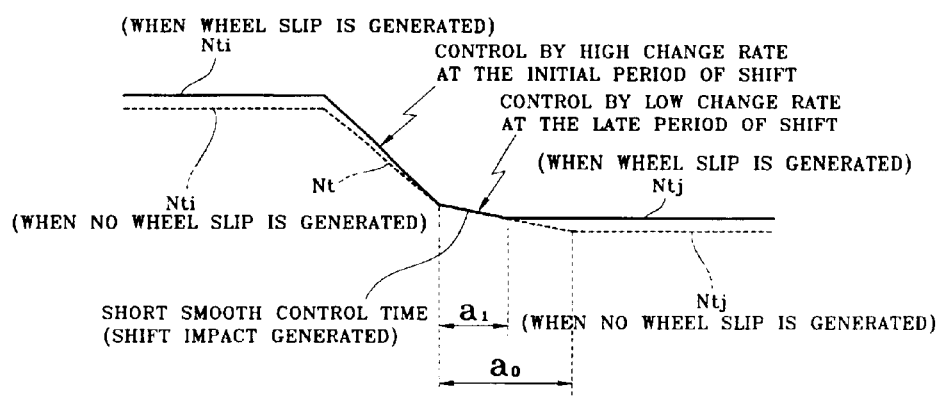
FIG. 4 is a graph illustrating turbine revolution changes when wheel slip occurs in conventional shifting.

A shift control method for automatic transmission thus constructed according to the present invention will be described in greater detail with reference to FIG. 2. When a vehicle starts to run, the vehicle run state detector 100 detects throttle valve openness, output shaft revolutions, engine revolutions, shift lever position, acceleration pedal operation state and the like, which vary in response to the run state of the vehicle. The shift control unit 200 outputs a predetermined control signal to the vehicle run state unit 100, the vehicle run state unit 100 outputs the throttle valve openness, output shaft revolution, engine revolution, shift lever position, acceleration pedal operation state and the like, synchronized and detected by the predetermined control signal output from the shift control unit 200. The shift control is synchronized at the point of time where the turbine revolutions as detected (Nt) are the same as the calculated turbine revolutions of the target shift stage.

When the acceleration pedal is manipulated by the driver to provide acceleration in an already running vehicle, the shift control unit 200 determines whether an up-shift condition is met in the power-on state. (S100 and S110). A determination is made as to whether the transmission output revolution (No) and throttle valve openness have changed from the current shift stage of the shift pattern, previously set in memory (not shown), to a higher shift stage. If so, the power-on up-shift condition is determined to have been met.

When the up-shift condition is satisfied in the power-on state, the shift control unit 200 calculates turbine revolution prior to shifting (Nti) and turbine revolution after shifting to the target shift stage (Ntj) based on an actual output shaft revolution (No) detected from a previously established program. The turbine revolution of the current shift stage (Nti) can be calculated by multiplying the actual output shaft revolution (No) by the gear ratio of the current shift stage. The turbine revolution of target shift stage (Ntj) can be obtained by multiplying the actual output shaft revolution (No) by gear ratio of target shift stage.

If the up-shift conditions are satisfied, the shift control unit 200 outputs an open loop duty control signal at initial up-shift control under power on state to effect the shift control, (S120). Successively, the shift control unit 200 determines whether the feedback control condition has been met. If the feedback control condition is met during the open loop duty control, feedback control is initiated by a previously established program (S140), as will be appreciated by a person of ordinary skill in the art based on the teachings set forth herein.

The shift control unit 200 then calculates a relative rate of change rate in turbine revolution ($\Delta$Ntj) as compared to the turbine revolutions after shifting (Ntj). (S150). This relative rate of change can be obtained by the following Formula 1.

Formula 1

Relative change rate of turbine revolution against turbine revolution after shifting $$(\Delta Ntj) = \frac{d}{dt}\left[\frac{Nt - Ntj}{|Nti - Ntj|}\right]$$

Where Nt is the instantaneous turbine revolutions at any point during the shift change.

The shift control unit 200 thereafter comparatively determines whether output shaft revolution (No) has changed, namely by determining whether wheel slip has occurred. (S160). If it is determined at step S160 that the output shaft revolution (No) has changed, the shift control unit 200 corrects relative positions against the turbine revolution before shift (Nti) and turbine revolution after shift (Ntj), and returns to step S150 where relative rate of change is re-calculated to effect the feedback control. (S170). In other words, when there is a change of output revolution during the shift control process, the turbine revolution after shift (Ntj) is changed and a more stable feedback control can be effected by adjusting changed amount (dNt/dt) corresponding to changed amount of the turbine revolution ($\Delta$Ntj) to thereby to reduce shift impact.

However, if it is determined at step S160 that output shaft revolution (No) was not changed during feedback control, the shift control unit 200 performs feedback control by utilizing a calculated value for the relative rate of change ($\Delta$Ntj) based on an established constant, (S200) (See Formula 2).

Formula 2

Relative change rate of turbine revolution against turbine revolution after shifting $$(\Delta Ntj) = \frac{d}{dt}\left[\frac{Nt - Ntj}{|Nti - Ntj|}\right] = \frac{1}{|Nti - Ntj|} \times \frac{dNt}{dt}$$

where |Nti–Ntj| is constant and $$\frac{dNti}{d} = 0, \frac{dNtj}{dt} = 0.$$

The constant may be calculated by a person of ordinary skill in the art based on the vehicle run state information.

Successively, the shift control unit 200 performs the feedback control as described above and comparatively determines whether shift synchronization has been completed. (S210 and S220). If it is determined at steps S210 and S220 that shift synchronization has been completed during the feedback control, the shift control unit 200 terminates the shift control and returns to main routine.

When $$\frac{d}{dt}\left[\frac{Nt - Ntj}{|Nti - Ntj|}\right]$$

is controlled when output shaft revolution (No) changes during feedback duty control, control can be effected in response to relative value of turbine revolution (Nt) compared to |Nti–Ntj|, and even in abrupt change of output shaft revolution (No), relative value compared to |Nti–Ntj| is not affected, enabling to performance of stable control.

As apparent from the foregoing, there is an advantage in the device and method for shift control in an automatic transmission of a vehicle thus described according to the present invention in that the feedback control is controlled by relative rate of change in turbine revolutions during power-on up-shift feedback control, thereby preventing generation of shift impact in the shifting process.

What is claimed is:

1. A device for shift control in an automatic transmission of a vehicle, the device comprising:

vehicle run state detecting means for detecting the run state of the vehicle and outputting at least one signal representative thereof;

shift control means for performing a power-on up-shift control and controlling relative rate of change in turbine revolution after shifting in the control process to effect a power-on up-shift feedback control when a predetermined control signal is output to the vehicle run state detecting means to receive a signal detected by the vehicle run state detecting means and a power-on up-shift signal is input from the vehicle by way of a vehicle shift mode state output in synchronization with the control signal; and driving means for supplying and stopping supply of oil pressure discharged from an oil pump to perform the shifting in response to a predetermined shift control duty signal output from the shift control means.

2. The device as defined in claim 1, wherein the vehicle run state detecting means comprises:

a throttle valve openness detector for detecting openness of throttle valve communicating with a manipulation state of an acceleration pedal operated by a driver;

an output shaft revolution detector for detecting revolution of the transmission output shaft varying in accordance with vehicle run state by way of a signal corresponding to running speed of a vehicle for application to determination of shift stage;

an engine revolution detector for detecting engine revolution varying in accordance with run state of a vehicle for application to determination of shift stage;

a shift lever position detector for detecting a position variable in accordance with shift lever manipulation state of a driver; and an acceleration pedal operation detector for detection operation state in accordance with acceleration pedal manipulation state of a driver.

3. A method of shift control in an automatic transmission of a vehicle, the method comprising:

effecting a power-on up-shift control when a power-on up-shift signal is input from a running vehicle and controlling a relative rate of change in turbine revolution after shifting, to effect a power on up-shift feedback control wherein the relative rate of change in turbine revolution after shift is obtained by $$\frac{d}{dt}\left[\frac{Nt - Ntj}{|Nti - Ntj|}\right],$$

where Nt is the instantaneous turbine revolutions, Nti is turbine revolutions before shifting and Ntj is turbine revolutions after shifting.

4. The method as defined in claim 3, wherein rate of change in turbine revolution after shift is calculated when output shaft revolution changes during power-on up-shift feedback control.

5. The method as defined in claim 3, wherein power-on up-shift feedback control is performed in response to a value calculated by multiplying turbine revolution rate of change by a predetermined constant when there is no change in output shaft revolution during power-on up-shift feedback control.

6. A method of shift control in an automatic transmission including a hydraulic system and turbine, the method comprising:

determining if up-shift conditions are met and continuing if met;

initiating duty control of the transmission hydraulic system;

determining if feedback control conditions are met and continuing if met; and initiating feedback control including continuously controlling turbine revolutions based on the relative rate of change of turbine revolutions during shifting wherein the feedback control further comprises:

determining if the transmission output revolutions have changed;

calculating the relative rate of change as $$\frac{d}{dt}\left[\frac{Nt - Ntj}{|Nti - Ntj|}\right]$$

when a change is determined, where Nt is turbine revolutions, Nti is turbine revolutions before shifting and Ntj is turbine revolutions after shifting; and calculating the relative rate of change as $$\frac{1}{|Nti - Ntj|} \times \frac{dNt}{dt},$$

where |Nti−Ntj| is constant and $$\frac{dNti}{d} = 0, \frac{dNtj}{dt} = 0,$$

when no change is determined.

* * * * *